US009681295B2

(12) United States Patent
Le Rouzic et al.

(10) Patent No.: US 9,681,295 B2
(45) Date of Patent: Jun. 13, 2017

(54) VERIFICATION AND CHECKING METHODS FOR USE IN A MULTIMEDIA IP CORE NETWORK, AND SERVERS

(71) Applicant: Orange, Paris (FR)

(72) Inventors: Jean-Claude Le Rouzic, Trebeurden (FR); José Doree, Lannion (FR)

(73) Assignee: ORANGE, Paris (FR)

( * ) Notice: Subject to any disclaimer, the term of this patent is extended or adjusted under 35 U.S.C. 154(b) by 39 days.

(21) Appl. No.: 14/429,985

(22) PCT Filed: Sep. 10, 2013

(86) PCT No.: PCT/FR2013/052075
§ 371 (c)(1),
(2) Date: Mar. 20, 2015

(87) PCT Pub. No.: WO2014/044951
PCT Pub. Date: Mar. 27, 2014

(65) Prior Publication Data
US 2015/0245206 A1 Aug. 27, 2015

(30) Foreign Application Priority Data

Sep. 24, 2012 (FR) ...................................... 12 58931

(51) Int. Cl.
*H04L 9/00* (2006.01)
*H04W 12/06* (2009.01)
(Continued)

(52) U.S. Cl.
CPC ............. *H04W 12/06* (2013.01); *H04L 63/08* (2013.01); *H04L 65/1016* (2013.01);
(Continued)

(58) Field of Classification Search
CPC ............. H04L 65/1016; H04L 61/3095; H04L 65/1073; H04L 63/08; H04L 65/1006; H04L 67/14; H04L 63/0407; H04L 63/126
See application file for complete search history.

(56) References Cited

U.S. PATENT DOCUMENTS

2003/0229787 A1* 12/2003 Gabor ............... H04L 29/12066
713/168
2005/0278420 A1* 12/2005 Hartikainen ............ H04L 63/08
709/203
(Continued)

FOREIGN PATENT DOCUMENTS

WO   WO 03/081937 A1 *  2/2003  ............... H04Q 7/38
WO   WO 2009/068429 A1 *  4/2009  ............. H04L 29/06

OTHER PUBLICATIONS

Aboda et al. The Network Access Identifier. The Internet Society, Internet Engineering Task Force (IETF), Request for Comments 4282, 16 pages. Dec. 2005.
(Continued)

*Primary Examiner* — Farid Homayounmehr
*Assistant Examiner* — Lizbeth Torres-Diaz
(74) *Attorney, Agent, or Firm* — Knobbe Martens Olson & Bear LLP (57) ABSTRACT

Disclosed is a verification method comprising reception of a registration request at a multimedia IP network core, the registration request containing a public identity of a user. The method also comprises interrogation of a user data server of the network core, comprising the transmission of a check request to the user data server in order to check a user's right to be registered with the registration server, the check request containing the public identity and a private identity. The method may be carried out by an interrogation server located upstream of the registration server. In addi-
(Continued)

tion, a piece of information is inserted by the interrogation server into the check request before it is sent to the user data server, the piece of information indicating if the private identity has been generated by the entity or received in the registration request.

14 Claims, 5 Drawing Sheets

(51) Int. Cl.
    *H04L 29/06*     (2006.01)
    *H04W 60/04*     (2009.01)
    *H04W 12/12*     (2009.01)

(52) U.S. Cl.
    CPC ......... *H04L 65/1073* (2013.01); *H04W 60/04* (2013.01); *H04L 63/0414* (2013.01); *H04W 12/12* (2013.01)

(56) References Cited

U.S. PATENT DOCUMENTS

| | | | |
|---|---|---|---|
| 2007/0055874 A1* | 3/2007 | Phan-Anh | H04L 63/0815 713/168 |
| 2008/0160996 A1* | 7/2008 | Li | H04L 65/1016 455/433 |
| 2009/0191868 A1* | 7/2009 | Siegel | H04L 65/1016 455/435.1 |
| 2011/0145388 A1* | 6/2011 | Hao | H04L 29/12594 709/223 |
| 2011/0310889 A1* | 12/2011 | Merino Vazquez | H04L 65/1069 370/352 |
| 2012/0011273 A1* | 1/2012 | Van Elburg | H04L 65/1073 709/238 |
| 2012/0036270 A1* | 2/2012 | Escribano Bullon | H04L 65/1016 709/227 |
| 2013/0294339 A1* | 11/2013 | Shi | H04L 65/1016 370/328 |

OTHER PUBLICATIONS

3rd Generation Partnership Project; Technical Specification Group Services and Systems Aspects; 3G security; Access security for IP-based services (Release 11). 3GPP TS 33.203, V11.1.0, 114 pages. Mar. 2012.

3rd Generation Partnership Project; Technical Specification Group Services and Systems Aspects; IP Multimedia Subsystem (IMS); Stage 2 (Release 11). 3GPP TS 23.228, V11.5.0, 288 pages. Jun. 22, 2012.

3rd Generation Partnership Project; Technical Specification Group Core Network and Terminals; IP multimedia call control protocol based on Session Initiation Protocol (SIP) and Session Description Protocol (SDP); Stage 3 (Release 11). 3GPP TS 24.229, V11.4.0, (Part 1) 375 pages. Jun. 27, 2012.

3rd Generation Partnership Project; Technical Specification Group Core Network and Terminals; IP multimedia call control protocol based on Session Initiation Protocol (SIP) and Session Description Protocol (SDP); Stage 3 (Release 11). 3GPP TS 24.229, V11.4.0, (Part 2) 370 pages. Jun. 27, 2012.

International Search Report mailed Nov. 18, 2013 for International Application No. PCT/FR2013/052075 filed Sep. 10, 2013, 7 pages.

International Search Report and Written Opinion mailed Nov. 18, 2013 for International Application No. PCT/FR2013/052075 filed Sep. 10, 2013, 12 pages.

\* cited by examiner

VERIFICATION AND CHECKING METHODS FOR USE IN A MULTIMEDIA IP CORE NETWORK, AND SERVERS

RELATED APPLICATIONS

This application is the U.S. National Phase of Application No. PCT/FR2013/052075 entitled "VERIFICATION AND CHECKING METHODS FOR USE IN A MULTIMEDIA IP CORE NETWORK, AND SERVERS" filed Sep. 10, 2013, which designated the United States, and which claims the benefit of French Application No. 1258931 filed Sep. 24, 2012.

BACKGROUND OF THE INVENTION

The invention relates to the general field of telecommunications.

It relates more particularly to managing the registration of users in a multimedia Internet protocol (IP) core network, such as for example a core network making use of the voice over IP (VoIP) technology and implementing an IP multimedia system (IMS) architecture, as defined in the third generation partnership project (3GPP) standard.

In known manner, voice over IP core networks are exposed to world of the Internet and its nuisances, in particular in terms of attacks and attempts at usurping identities specific to IP networks. The parties involved in implementing standards (and in particular telephone operators) who participate in defining these new telecommunications standards are thus concerned to propose security procedures that are irreproachable in order to avoid users suffering from the inconveniences that result from identity thefts.

For IMS core networks, there is provision to implement such procedures in particular when registering users (or in equivalent manner, when registering their terminals) with the core network. The way a user is registered with an IMS core network is set out in 3GPP documents TS 23.228 and TS 24.229.

In well-known manner, a subscriber is made known with an IMS core network by means of a subscription, in which various identities of the user are declared, namely:

the user's public identity (e.g. telephone number, contact name, session initiation protocol uniform request identifier (SIP URI)), or IP multimedia public user identity (IMPU), which are associated with information about the services to which the user has subscribed (in other words the user's service profile); and
  the user's private identity or IP multimedia private user identity (IMPI), which is usually generated by the operator of the IMS core network in random manner in the network access identifier (NAI) format as defined in Document RFC 4282 published by the Internet Engineering Task Force (IETF), which private identity is associated with information for authenticating the user (e.g. a password).

These public and private identities are stored in a user (or subscriber) data server of the core network that is also known as a home subscriber server (HSS). Both identities are needed to enable a user to register with the IMS core network.

In its present state, the 3GPP standard provides for a plurality of authentication procedures that can be applied when registering a user with an IMS core network. One of these procedures is the SIP Digest method, that is commonly implemented in the industry and in particular by core network operators.

To simplify the following description, the term "registering a user's terminal with an IMS core network" and "registering a user with an IMS core network" are used interchangeably.

Figure 1:
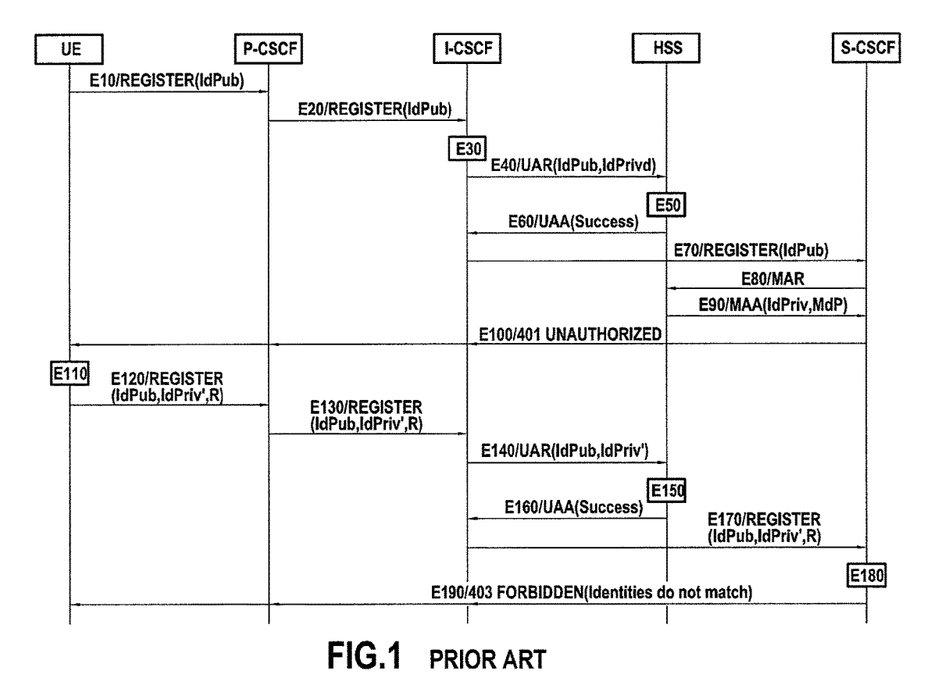
FIG. 1, described above, shows how registration requests are processed in an IMS core network of the kind specified by the 3GPP standard in its present definition.

FIG. 1 shows the main steps performed in a known example of the state of the art while registering a user during an authentication procedure that makes use of the SIP Digest method. This prior art example is the result of the IMS core network industry modifying the specifications of the 3GPP standard in order to enable the SIP Digest method to be used when registering a user.

The main entities involved during this procedure are firstly the user's terminal or "user equipment" (UE), and secondly in the IMS core network, a proxy call session control function (P-CSCF) server, an interrogating call session control function (I-CSCF) server, a serving call session control function (S-CSCF) server, and an HSS. The I-CSCF and S-CSCF servers dialog with the HSS via the Diameter Cx/Dx interfaces.

The function of each of these entities and of the Diameter Cx/Dx interfaces are known to the person skilled in the art and are therefore not described in detail herein. Only those elements that are necessary to understanding the invention and its context are described in detail below.

With reference to FIG. 1, the user's terminal UE sends a first registration request REGISTER to the P-CSCF server of the IMS core network, which request complies with the SIP protocol (step E10).

This first request contains the public identity IdPub of the user, together with a contact address for the terminal UE in the network. Nevertheless, the user is not required to provide the user's private identity during this first registration request.

On receiving this first request, the P-CSCF server interrogates a domain name server (DNS), not shown in FIG. 1, in order to obtain the address of the I-CSCF server of the nominal network of the user of the terminal UE.

Thereafter it forwards the first registration request received from the terminal UE to the I-CSCF server specified by the DNS (step E20).

On receiving this first request that contains only the public identity IdPub of the user of the terminal UE, and in application of the 3GPP standard, the I-CSCF server generates a private identity IdPrivd for the user. In the example shown in FIG. 1, this private identity IdPrivd is derived from the public identity IdPub (step E30) in the manner described in paragraph §5.3.1.2 of Document TS 24.229.

Thereafter, the I-CSCF server interrogates the HSS of the IMS core network with a user authorization request (UAR) in compliance with the Diameter protocol, which request contains the pair constituted by the public identity IdPub received in the first registration request and the private identity IdPrivd derived from the public identity IdPub by the I-CSCF server (step E40). This interrogation seeks to check that the user associated with these identities is indeed authorized to register with the IMS core network.

In the example of FIG. 1, on receiving the UAR, the HSS detects that the private identity IdPrivd is an identity derived from the public identity IdPub in compliance with the derivation procedure described in Document TS 24.229.

It then verifies that the user of the terminal UE is entitled to register with the IMS core network on the basis solely of the public identity IdPub used by the terminal UE (step E50). In other words, the checking performed by the HSS is limited to verifying that the public identity IdPub provided by the terminal UE in the first registration request does indeed correspond to a user known to the core network (i.e. a user who has been declared during a prior subscription with the operator of the core network), and is thus authorized to register therewith.

Where applicable, the HSS sends a Diameter user authorization answer (UAA) message to the I-CSCF server indicating that the user associated with the public identity IdPub is known and entitled to register with the core network. In this answer message, it also specifies the capabilities that are necessary for the S-CSCF server that is to be selected for registering the terminal UE, and also capabilities that are optional (step E60).

On receiving this answer message, the I-CSCF server selects an S-CSCF server having the capabilities specified by the HSS, and transfers the first registration request received from the terminal UE to the S-CSCF server as selected in this way (step E70).

On receiving the first request for registering the terminal UE, the S-CSCF server creates a context associated with the terminal UE and starts authenticating it.

To this end, it requests information from the HSS enabling the terminal UE to be authenticated by means of a Diameter multimedia authentication request (MAR) (step E80). In accordance with the Diameter interface specified between the S-CSCF server and the HSS, this MAR contains the public identity IdPub contained in the registration request together with the private identity generated by the S-CSCF server for the user (e.g. the private identity IdPrivd).

In response to this request, the S-CSCF server receives, via a Diameter multimedia authentication answer (MAA) message, the private identity IdPriv together with the password MdP of the legitimate user associated with the public identity IdPub, as registered when taking out the subscription with the HSS in association with the public identity IdPub (step E90). This information is naturally encrypted to ensure that it is kept confidential. It is stored in the previously created user context.

For obvious security reasons, it should be observed that the private identity IdPrivd as registered with the HSS when the legitimate user of the public identity IdPub takes out a subscription is generally different from the private identity IdPrivd that can be derived from the public identity in application of the recommendations of the 3GPP standard.

The S-CSCF server then returns a 401 Unauthorized answer to the terminal UE containing a challenge, so that the terminal UE uses its own password to calculate a user authentication result (step E100).

The terminal UE evaluates the user authentication result R with the help of the challenge communicated by the S-CSCF server (step E110).

Thereafter it sends a second registration request REGISTER to the P-CSCF server containing its public identity IMPU, its private identity, and the user authentication result R that it has just evaluated (step E120).

The private identity inserted by the terminal UE in the second request REGISTER as sent to the P-CSCF server is written IdPriv'.

The P-CSCF server relays this second request to the I-CSCF server (step E130).

The I-CSCF server detects that the second request REGISTER contains a public identity IdPub and a private identity IdPriv' of the user of the terminal UE.

It then interrogates the HSS using a Diameter UAR containing the pair formed by the public identity IdPub and the private identity IdPriv' received in the second registration request, and it does this in order to determine whether the user associated with these two identities is authorized to register with the IMS core network (step E140).

Two situations can then arise:

1) the HSS detects that the private identity IdPriv' extracted from the second registration request is derived from the public identity IdPub in compliance with the derivation procedure described in Document TS 24.229: under such circumstances, and as described above, the HSS verifies that the user is entitled to register with the core network solely on the basis of the public identity IdPub (step E150); or 2) the private identity IdPriv' is considered by the HSS as being not derived from the public identity IdPub in the meaning of the 3GPP standard: under such circumstances, the HSS checks the entitlement of the user to register with the core network on the basis of the pair formed by the public identity IdPub and the private identity IdPriv' contained in the UAR (step E150). In other words, the user of the terminal UE will be authorized to register only if the private identity IdPriv' specified by the terminal UE in the second registration request matches the identity IdPriv stored in the HSS (as declared in association with the public identity IdPub when the user took out the subscription with the IMS core network).

Where appropriate, the HSS sends a positive Diameter UAA to the I-CSCF server informing it that the user associated with the identities (IdPub, IdPriv') is indeed known to the core network and is entitled to register (step E160).

On receiving this positive UAA, the I-CSCF server transfers the second registration request received from the terminal UE to the S-CSCF server associated with this terminal during step E70 (step E170).

If the UAA is negative, the registration request of the user of the terminal UE is rejected by the I-CSCF server (not shown).

The S-CSCF server verifies that the authentication information (IdPub, IdPriv', and R) provided by the terminal UE matches the information (IdPub, IdPriv, and MdP) provided by the HSS (step E180) and gives an answer to the terminal UE as a function of the result of this verification (step E190).

If the second registration request is rejected by the S-CSCF server, it informs the terminal UE of the grounds for this rejection in its answer message sent to the terminal UE (e.g. mismatch between the private identity IdPriv' and the private identity IdPriv, or indeed mismatch between the passwords). This message is relayed by the I-CSCF server to the terminal UE via the S-CSCF server.

Unfortunately, this authentication procedure presents a weakness in terms of security, and a computer pirate can easily take advantage of this known mode of operation for the entities I-CSCF, HSS, and S-CSCF in order to attempt attacks on the password or on the private identity of a legitimate user, these attacks being based on the legitimate user's public identity.

Specifically, it is easy for a computer pirate in application of the recommendations of the 3GPP standard to derive the private identity IdPrivd from the public identity IdPub, and to deliver this derived private identity to the IMS core network in the second registration request (i.e. IdPriv'=IdPrivd).

This second registration request is then propagated to the S-CSCF server as described above with reference to FIG. 1, and this occurs even if the private identity IdPrivd does not match the private identity IdPriv stored in the HSS in association with the public identity IdPub.

Because of the mismatch between the private identities IdPrivd and IdPriv, the S-CSCF server will indeed reject the second registration request sent by the computer pirate. However it will simultaneously inform the computer pirate of the grounds for the rejection (mismatch between the private identities or between the passwords).

Such information can be extremely precious for the computer pirate, since the pirate is informed about how well the attack is progressing. The pirate can then attempt to find the correct private identity and the correct password of the legitimate user of the public identity IdPub by brute force, i.e. by making multiple authentication attempts with the S-CSCF server.

OBJECT AND SUMMARY OF THE INVENTION

The invention seeks in particular to remedy this drawback and to increase the level of security of a multimedia IMS core network by relying on an authentication technique that provides for the identities of a user to be delivered in two stages like the above-described SIP Digest (or HTTP Digest) authentication procedure, with registration requests sent by terminals being blocked (i.e. rejected) as far upstream as possible (relative to the travel direction of the requests) in the core network, in other words, as soon as registration requests enter into the nominal core network of the user, with this being done as soon as the identities conveyed in the registration request do not match with the identities registered when the legitimate user of the public identity took out the subscription.

To this end, the invention provides a verification method for performing in a multimedia IP core network, the method comprising:
  a reception step of an interrogation server of the core network receiving a registration request to register with a registration server of the core network, the registration request containing a public identity of a user, the interrogation server being situated upstream from the registration server in the core network; and
  an interrogation step of the interrogation server interrogating a user data server of the core network, this step comprising sending to the user data server a checking request for checking whether the user is entitled to register with the registration server of the core network, this checking request containing the public identity of the user contained in the registration request and a private identity of the user;
  the verification method being remarkable in that it further comprises an insertion step of the interrogation server inserting information into the checking request prior to sending it to the user data server, which information indicates whether the private identity of the user contained in the checking request was generated by the interrogation server or was received by it in the registration request.

The invention also provides a checking method for performing by a user data server of a multimedia IP core network, the method comprising:
  a reception step of receiving a checking request for checking whether a user is entitled to register with a registration server of the core network, this checking request coming from an interrogation server of the core network situated upstream from the registration server and containing:
    a public identity and a private identity of the user; and
    information indicating whether the private identity of the user contained in the checking request was generated by the interrogation server or was received thereby in a registration request from the user;
  if the data server determines from this information that the private identity of the user was not generated by the interrogation server, a checking step during which it verifies that the pair formed by the public identity and the private identity contained in the checking request corresponds to a user authorized to register; else
  a checking step during which it verifies whether the public identity contained in the checking request corresponds to a user authorized to register.

Correspondingly, the invention also provides an interrogation server of a multimedia IP core network, the interrogation server comprising:
  reception means for receiving a registration request from a registration server of the core network and containing a public identity of a user; and
  interrogation means for interrogating a user data server of the core network, the interrogation means including means for sending a checking request to the user data server for checking whether a user is entitled to register with the registration server of the core network, this checking request containing the public identity of the user contained in the registration request and a private identity of the user;
  the interrogation server being situated upstream from the registration server and being remarkable in that it further comprises insertion means for inserting information into the checking request prior to sending it to the user data server, which information indicates whether the private identity of the user contained in the checking request was generated by the interrogation server or was received thereby in the registration request.

The invention also provides a user data server of a multimedia IP core network, the user data server comprising:
  reception means for receiving a checking request for checking whether a user is entitled to register with a registration server of the core network, the checking request coming from an interrogation server of the core network situated upstream from the registration server and containing:
    a public identity and a private identity of the user; and
    information indicating whether the private identity of the user contained in the checking request was generated by the interrogation server or was received thereby in a registration request from the user; and
  checking means configured:
    to verify that the pair formed by the public identity and the private identity contained in the checking request corresponds to a user authorized to register, if the checking means determine from the information contained in the checking request that the private identity of the user was not generated by the interrogation server; else
    to verify that the public identity contained in the checking request correspond to a user authorized to register.

As mentioned above, the invention has a preferred but non-limiting application when the multimedia IP core network implements an IMS architecture, and wherein:
  the interrogation server is an I-CSCF server;
  the user data server is an HSS; and
  the registration server is an S-CSCF server.

In a variant embodiment, it is possible to envisage that other entities or servers of the IMS core network (i.e. in addition to the I-CSCF server) also insert information as proposed by the invention into their requests interrogating the user data server, which information as proposed by the invention is indicative of the origin of the private identity included in the request.

Thus, in particular, such information may be inserted by the S-CSCF registration server in an MAR that extends to the HSS in order to obtain user authentication data, or in certain contexts, in a server assignment request (SAR) as described in the 3GPP standard.

In other words, in this variant embodiment, the verification method further comprises:
  a reception step of the registration server receiving the registration request containing the public identity of the user;
  an interrogation step of the registration server interrogating the user data server by sending a request thereto for obtaining data enabling the user to be authenticated, this data-obtaining request containing the public identity of the user contained in the registration request and a private identity of the user; and
  an insertion step of the registration server inserting information into the data-obtaining request prior to sending it to the user data server, which information indicates whether the private identity of the user contained in the data-obtaining request was generated by the registration server or was received thereby in the registration request.

In similar manner, the user data server to which the information about the origin of the private identity is sent may also be a subscriber location function (SLF) server of the IMS core network. Such an SLF server is interrogated in known manner by the I-CSCF server via a Diameter interface on receiving a request to register a user in order to identify which HSS the I-CSCF server needs to interrogate for this particular user. The request used for interrogating the I-CSCF server contains a public identity and a private identity of the user (possibly as derived from the I-CSCF server).

It is also possible to envisage another variant embodiment in which an S-CSCF server interrogates an SLF server with the help of a request containing a public identity and a private identity of the user (possibly as derived by the S-CSCF server), together with information as proposed by the invention indicating the origin of the private identity of the user.

These variant implementations thus propose global modification to the communications interfaces (typically Diameter Cx/Dx interfaces) that are presently defined for interrogating the user (or subscriber) data servers of an IMS core network, such as an HSS or an SLF server: there is thus no need to make a distinction in these interfaces between the types of server involved (e.g. I-CSCF v. S-CSCF, or HSS v. SLF), thereby simplifying changes thereto in order to incorporate the invention.

Furthermore, the verification and checking methods of the invention are applicable in preferred manner in the context of a procedure for authenticating the user in compliance with an SIP Digest or an HTTP Digest procedure, i.e. in the context of an authentication procedure that makes provision for public and private identities of a user to be delivered in two stages.

Nevertheless, it is possible to envisage applying the invention independently of this assumption about providing public and private identities of the user in two stages, in particular in order to simplify the procedures implemented by the multimedia IP core network when it needs to support various types of authentication procedure.

The invention thus relies on a change in the behavior in particular of the interrogation server, i.e. the entry point for requests issued by the terminal of the user to the nominal core network of the user, and also changes to the behavior of the user data server.

More precisely, the invention advantageously proposes inserting additional information into the checking request issued by the interrogation server in order to verify with the user data server whether the user is entitled to register with the core network, which information is additional to the public and private identities of the user, this information being provided by the interrogation server itself, and indicating whether the private identity present in the checking request was or was not generated by the interrogation server (in other words whether it was or was not received in the registration request). Since this information is provided by the core network itself, it can be considered as being reliable.

On the basis of this information, the idea is to inform the user data server about the origin of the private identity so that it can adapt accordingly the identity checking that it is about to perform. More particularly, the information inserted by the interrogation server in accordance with the invention enables the user data server to determine whether the checking that it is to perform should relate to the public identity only of the user or to the pair constituted by the public identity and by the private identity of the user that are present in the checking request sent by the interrogation server. This enables the core network to detect very quickly when a user identity has been usurped.

The interrogation server needs itself to generate a private identity for the user only when the registration request it receives from the terminal seeking to register with the public identity of the user does not already contain such a private identity.

As explained above, in the present state of standards and practices, when an interrogation server, or more generally an entity of the core network, generates a dummy private identity for a user because there is no such private identity in the user's registration request, the dummy identity is generally generated using a known derivation rule, e.g. on the basis of the user's public identity or of a predefined value (e.g. the value zero). Nevertheless, it should be observed that the invention would apply equally well if new standards or practices were to provide other processes for generating this dummy private identity.

Since the rule for deriving the identity is known, it can easily be used by a computer pirate in order to generate a private identity associated with the public identity of a user, in order to register with the core network.

Naturally, as mentioned above, for obvious security reasons, the private identity associated with the public identity of a user when taking out a subscription with the operator of the core network is generally selected to be distinct from the private identity that can be derived from the public identity of the user in application of the recommendations of the standard, or more generally with the help of the above-mentioned derivation rule.

Consequently, the fact that the terminal provides as its private identity the identity derived using the derivation rule, leaves doubt as to the honesty of the user of the terminal. This situation, which the inventors consider to be suspect, can easily be detected and checked in application of the invention by the user data server implementing more advanced checking about the entitlement of the user of the terminal to register with the core network, based on the pair formed by the public identity and the private identity as provided by the terminal, and not only on the public identity.

As a result, if the (public identity, private identity) pair provided by the terminal in the registration request does not correspond to the pair of identities generated when the legitimate user took out the subscription and stored in the user data server, the registration request issued by the terminal will be blocked and rejected by the interrogation server, even before being transferred to the registration server.

Consequently, the invention serves to prevent information issued by the registration server being returned, which information can be precious to a potential computer pirate for tracking the progress of an attack. The computer pirate also has no other access to critical information concerning the authentication parameters of the legitimate user of the public identity, and in particular has no access to that user's password, since the registration request is blocked by the interrogation server in the event of the user data server providing a negative check, and the interrogation server is situated upstream from the registration server and does not know the user's authentication parameters (since the user data server sends these parameters only to the registration server).

Furthermore, the invention makes it possible to limit superfluous data exchanges between the interrogation server and the registration server: this serves to economize on the use of resources in the multimedia IP core network.

Advantageously, the invention is relatively simple to perform: it requires only one piece of information, which is already known to the interrogation server, to be added to the checking request sent to the user data server (e.g. in a field of the checking request provided for this purpose, or in the form of a suffix or a prefix added to the private entity), followed by interpretation of that information by the user data server.

The invention therefore requires very little modification to be made to the ways in which interrogation, registration, and user-data servers operate as presently defined in the 3GPP standard for an IMS core network.

It should be observed that the information added by the interrogation server in accordance with the invention may be added in each checking request (whether or not the private identity included in the request is derived from the public identity), or in a variant it may be included only in checking requests when a private identity that has been derived from the public identity is delivered to the user data server.

In similar manner, the processing of registration requests in accordance with the invention can be performed equally well on all registration requests received by the interrogation server, i.e. both on the (first) registration request issued by the terminal containing only the public identity of the user of the terminal, and on the (second) registration request issued by the terminal and containing both the public identity and the private identity of the user.

As a result, the processing of registration requests by the interrogation server is made systematic (no additional intelligence needs to be provided to the interrogation server associated with making a distinction between various kinds of registration requests and how to process them), thus making it possible to ensure that the interrogation server presents little complexity.

In a variant, it is possible to envisage that the interrogation server inserts information about the origin being derived from the public identity only into the (second) registration request issued by the terminal that contains both the public identity and the private identity of the user, together with the user authentication result obtained in response to the challenge sent by the registration server.

As a result, the user data server changes its behavior compared with the standard only when it detects the presence of information inserted in accordance with the invention into the request for checking the entitlement of the user to register that has been sent thereto by the interrogation server.

In an implementation of the invention, when the interrogation server determines on the basis of an answer to the checking request received from the data server that the user is not authorized to register, the verification method further comprises a sending step of sending a message to the registration request to release resources allocated to the user.

This implementation is preferably applied when the interrogation server has already transferred a first registration request coming from the terminal and containing a public identity of the user to a registration server of the core network, and that the registration server has given a negative answer to the terminal by returning a challenge to the terminal so that it can authenticate itself. During the processing of the first registration request by the registration server, a context associated with the user is indeed created by the registration server, and resources are allocated thereto.

This implementation of the invention thus makes it possible for the resources that are allocated by the registration server to the user to be released quickly, in other words as soon as it is detected that the terminal is not entitled to register with the multimedia IP core network.

In another implementation, the resources allocated to the user by the registration server are released at the end of a timeout started when the registration server sends a message to the terminal requesting it to authenticate itself and containing a challenge.

In a particular implementation, the various steps of the verification method and of the checking method are determined by computer program instructions.

Consequently, the invention also provides a computer program on a data medium, the program being suitable for being implemented in an interrogation server and more generally in a computer, the program including instructions adapted to perform the steps of a verification method as described above.

The invention also provides a computer program on a data medium, the program being suitable for being performed in a user data server or more generally in a computer, the program including instructions adapted to performing steps of a checking method as described above.

These programs may use any programming language, and may be in the form of source code, object code, or code intermediate between source code and object code, such as in a partially compiled form, or in any other desirable form.

The invention also provides a computer-readable data medium including instructions of a computer program as mentioned above.

The data medium may be any entity or device capable of storing the program. For example, the medium may comprise storage means such as a read only memory (ROM) or a compact disk (CD) ROM, or a microelectronic circuit ROM, or indeed magnetic recording means, e.g. a floppy disk or a hard disk.

Furthermore, the data medium may be a transmissible medium such as an electrical or optical signal, suitable for being conveyed via an electrical or optical cable, by radio, or by other means. The program of the invention may in particular be downloaded from an Internet type network.

Alternatively, the data medium may be an integrated circuit in which the program is incorporated, the circuit being adapted to execute or to be used in the execution of the method in question.

In another aspect, the invention also provides a multimedia IP core network comprising an interrogation server and a user data server in accordance with the invention.

In a variant embodiment, the core network further comprises a registration server comprising:
- reception means for receiving the registration request containing the public identity of the user;
- interrogation means for interrogating the user data server and comprising means for sending a request to the user data server to obtain data enabling the user to be authenticated, this data-obtaining request containing the public identity of the user contained in the registration request and a private identity of the user; and
- insertion means for inserting information into the data-obtaining request prior to sending it to the user data server, which information indicates whether the private identity of the user contained in the data-obtaining request was generated by the registration server or was received thereby in the registration request.

In another variant, the core network implements an IMS architecture and:
- the interrogation server is an I-CSCF server;
- the user data server is an HSS; and
- the registration server is an S-CSCF server.

The multimedia IP core network of the invention benefits from the same advantages as those described above for the interrogation server and the data server.

In other implementations and/or embodiments, it is also possible to envisage that the verification method, the checking method, the interrogation server, the user data server, and the core network of the invention present in combination all or some of the above-mentioned characteristics.

BRIEF DESCRIPTION OF THE DRAWINGS

Other characteristics and advantages of the present invention appear from the following description made with reference to the accompanying drawings, which show implementations having no limiting character.

In the figures.

DETAILED DESCRIPTION OF THE INVENTION

Figure 2:
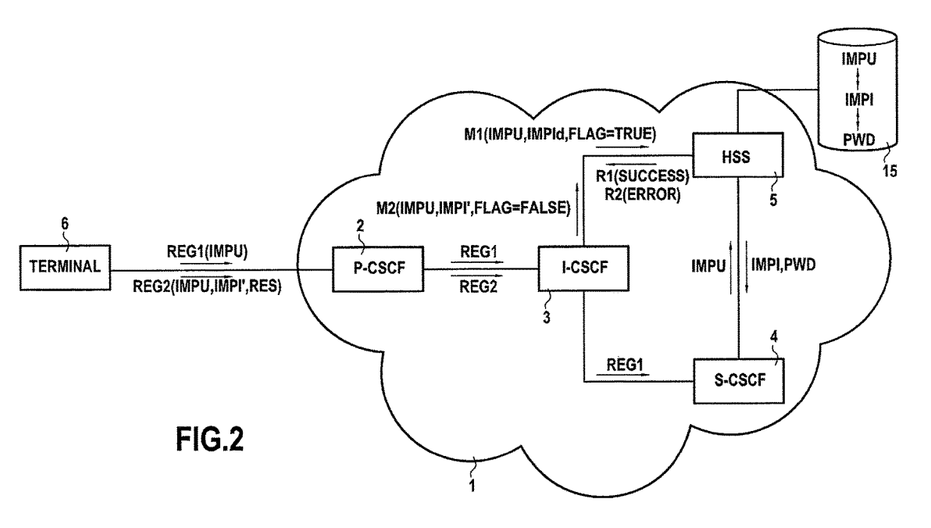
FIG. 2 is a diagram representing a multimedia IP core network, an interrogation server, and a user data server in accordance with the invention, in a particular embodiment.

FIG. 2 shows a particular embodiment of a multimedia IP core network 1 of the invention in its environment.

In the example shown in this figure, the core network 1 is a core network making use of VoIP technology, using an IMS architecture as defined by the 3GPP standard in Document TS 23.228 entitled "IP multimedia subsystem; stage 2", Release 11, Jun. 22, 2012. In known manner, such an architecture makes use of the session initiation protocol known as SIP.

Nevertheless, these assumptions are not themselves limiting, and the invention is equally applicable to other multimedia IP core networks and to other protocols for initiating a session.

In known manner, a core network implementing an IMS architecture (i.e. an IMS core network) comprises a plurality of functional entities including a core session control function (CSCF) entity made up of a plurality of servers including the following:
- a P-CSCF server constituting the connection point between an access network and the IMS core network 1;
- an I-CSCF server constituting a point for switching service requests from terminals (e.g. registration requests) into the IMS core network 1; and
- an S-CSCF server that is in charge in particular of registering terminals with the IMS core network and of checking the sessions of these terminals.

Thus, in the example shown in FIG. 2, the IMS core network 1 has a P-CSCF server 2, an I-CSCF server 3, and an S-CSCF server 4. The I-CSCF server 3 is situated upstream from the S-CSCF server 4 (in the travel direction of service requests issued by terminals in the core network 1, and more particularly in this example relative to the travel direction of requests by users to register with the core network; in order words, these registration requests transit firstly via the I-CSCF server 3 before being switched, where appropriate, to the S-CSCF server 4 for processing).

The core network 1 also has a user data HSS 5 that stores the subscription data of users who are subscribers with the operator of the core network 1. The HSS 5 interacts with the other entities of the core network 1 by using the Diameter protocol that is known to the person skilled in the art.

The subscription data stored by the HSS 5 includes in particular the public identity (e.g. telephone number, contact name, SIP URI address) of each user, in association with information about the services to which the user is entitled (in other words the user's service profile), together with the user's private identity, which information is associated with the authentication information of the user (access parameters such as a password, for example). These two identities are needed by each user seeking to register with the core network 1.

Thus, it is assumed at this point that a user U has previously taken out a subscription with the operator of the core network 1 in which there are declared the user's public identity IMPU in association with a private identity IMPI and a password PWD, and that this information is stored in the HSS 5.

In accordance with the mode of operation of an IMS core network, in order to be able to access the services made available by the operator of the core network 1, a user must begin by registering with the core network 1 via a terminal (in the example shown in FIG. 2, via the terminal 6).

In this example, the registration is governed by an SIP Digest authentication procedure during which the user needs to provide in succession, via two distinct registration requests (SIP REGISTER requests), the user's public identity and then private identity in association with the user's access parameters.

In a variant, other authentication procedures providing for user identities to be delivered in two stages can be envisaged in the context of the invention, such as for example an HTTP Digest authentication procedure.

Nevertheless, it should be observed that the invention can equally apply to a context in which, in order to register with a core network the user is required to provide in the first registration request both the user's public identity and the user's private identity.

Any SIP REGISTER registration request sent to the core network 1 by the terminal 6 using the public identity IMPU of the user U transits via the P-CSCF server 2 before being taken to the I-CSCF server 3 for managing the public identity IMPU.

The I-CSCF server 3 then sends a checking request UAR to the HSS 5 to verify that the terminal 6 is authorized to register with the core network 1 prior to transferring, where applicable, the registration request to the S-CSCF server 4 for processing and authenticating the user of the terminal. The checking request UAR is thus a request to check that the user is entitled to register with the S-CSCF server 4 (or more generally with a registration server) of the core network 1 in the meaning of the invention.

This checking request UAR used for interrogating the HSS 5 contains the public identity IMPU and a private identity as specified where appropriate in the registration request by the terminal 6 or as generated by the I-CSCF server 3. In the presently-described implementation, the private identity generated by the I-CSCF server 3 is derived from the public identity IMPU in application of the recommendations of the 3GPP standard as specified in paragraph §5.3.1.2 of Document TS 24.229. Naturally, other derivation rules could be envisaged in a variant.

The I-CSCF server 3 is an interrogation server in accordance with the invention. In this example it incorporates the main characteristics and functions of an I-CSCF server as defined by the 3GPP standard, together with the characteristics of an entity in accordance with the invention. The I-CSCF server 3 is thus provided with means for inserting additional information into the checking request before sending it to the HSS 5, which additional information indicates whether the private identity included in the checking request was generated by itself on the basis of the user's public identity.

In this example, these insertion means are software means. More precisely, in the presently-described embodiment, the I-CSCF server 3 has the hardware architecture of a computer, as shown diagrammatically in FIG. 3A.

Figure 3A:
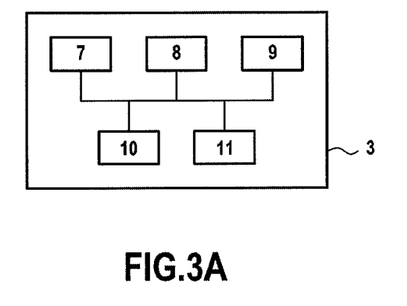
FIGS. 3A and 3B show the hardware architectures respectively of the interrogation server and of the data server shown in FIG. 2.

In particular, it comprises a processor 7, a random access memory (RAM) 8, a ROM 9, a non-volatile flash memory 10, together with communications means 11. These communications means 11 implement the SIP protocol for communicating with the other entities of the core network 1 and with the terminal 6, and also the Diameter protocol, for communicating with the user data HSS 5.

The ROM 9 of the I-CSCF server 3 constitutes a data medium in accordance with the invention that is readable by the processor 7 and that stores a computer program in accordance with the invention including instructions for executing steps of a verification method in accordance with the invention as described below with reference to FIG. 4.

In accordance with the invention, the additional information inserted by the I-CSCF server 3 into the checking request is interpreted by the HSS 5, and enables it to adjust the level of checking that is to be performed in order to determine whether the user of the terminal 6 is entitled to register.

The HSS 5 is thus a user data server in accordance with the invention. In this example it incorporates the main characteristics and functions of an HSS as defined by the 3GPP standard, and it is also provided with means suitable for interpreting the information added by the I-CSCF server 3, and for checking the entitlement of the terminal 6 to register with the core network 1 as a function of this information.

In this example, these means are software means. More precisely, in the presently-described embodiment, the HSS 5 has the hardware architecture of a computer, as shown diagrammatically in FIG. 3B.

Figure 3B:
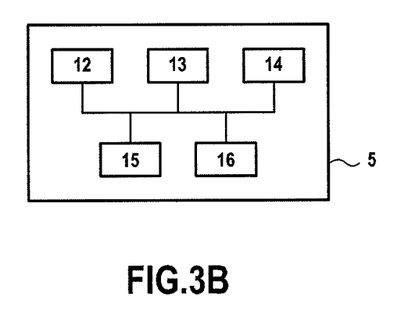

In particular, it comprises a processor 12, a RAM 13, a ROM 14, a non-volatile flash memory 15 containing the subscription data of subscribers with the core network 1, and communications means 16 implementing the Diameter protocol for communicating with the entities of the core network 1.

The ROM 14 of the HSS 5 constitutes a data medium in accordance with the invention, that is readable by the processor 12 and that stores a computer program in accordance with the invention including instructions for executing steps of a checking method in accordance with the invention as described below with reference to FIG. 5.

In the presently-described implementation, in order to harmonize the Diameter communications interface used both between the I-CSCF server 3 and the HSS 5, and also between the S-CSCF server 4 and the HSS 5, each request sent by the I-CSCF server 3 and by the S-CSCF server 4 for interrogating the HSS 5 contains additional information in accordance with the invention relating to the origin of the private identity contained in the request being used for interrogating the HSS 5 (i.e. indicating whether the private identity was or was not generated by the I-CSCF server 3 or by the S-CSCF server 4, or whether it comes from the user's registration request). The various interrogation requests in this example are UARs for checking the user's entitlement to register as sent by the I-CSCF server 3, MARs for obtaining data enabling the user to be authenticated, and possibly SARs sent by the S-CSCF server 4 to the HSS 5.

In similar manner, the invention also applies to other user data servers using Diameter Cx/Dx interfaces for communicating with the entities of the IMS core network, such as for example a subscriber location function (SLF) server interrogated by the I-CSCF server 3 or by the S-CSCF server 4 to determine the HSS to which the checking request associated with the incoming registration requests are to be directed.

Figure 4:
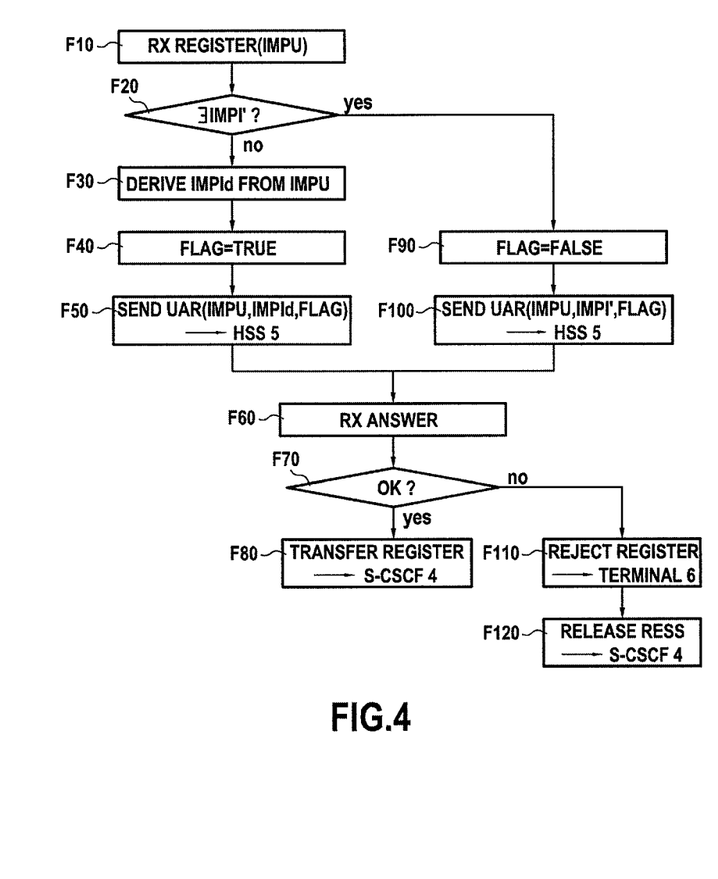
FIG. 4 is a flow chart showing the main steps of a verification method as performed in a particular implementation by the interrogation server of FIG. 2.
Figure 5:
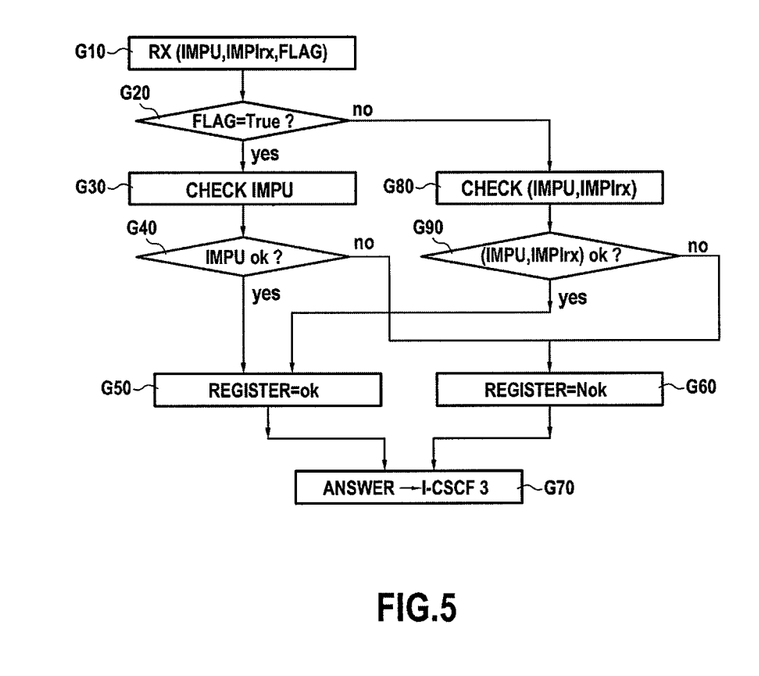
FIG. 5 is a flow chart showing the main steps of a checking method as performed in a particular implementation by the user data server shown in FIG. 2.

With reference to FIGS. 4 and 5 respectively, there follows a description of the main steps of a verification method in accordance with the invention and the main steps of a checking method in accordance with the invention, in particular implementations in which the methods are implemented respectively by the I-CSCF server 3 and by the HSS 5 of FIG. 2, during an attempt at registration with the core network 1 made by the terminal 6.

In order to better illustrate the invention, it is assumed that the terminal 6 uses the public identity IMPU of the user U and a private identity IMPI' for the purpose of registering with the core network 1.

The user U is assumed to be known to the HSS 5 (i.e. the user U is a legitimate user of the public identity IMPU), as a result of previously taking out a subscription with the operator of the core network 1: as mentioned above, the user is associated in the non-volatile memory 15 of the HSS 5 with the public identity IMPU, the private identity IMPI, and the password PWD.

At this stage of the description, no assumption is made as to the match (i.e. similarity) between the private identities IMPI' and IMPI. In other words, the person seeking to register with the core network 1 using the public identity IMPU via the terminal 6 is not necessarily the legitimate user U of the public identity IMPU who previously took out a subscription with the core network 1.

It is assumed that the terminal 6 sends a first SIP REGISTER registration request REG1 to the P-CSCF server 2.

In accordance with the SIP Digest procedure, this first registration request REG1 contains the public identity IMPU of the user U together with a contact address of the terminal 6. In contrast, it does not contain a private identity.

On receiving the request REG1, the P-CSCF server 2 interrogates a DNS to obtain the address of the I-CSCF server of the nominal network of the user associated with the public identity IMPU. In the presently-described example, this I-CSCF server is the I-CSCF server 3.

The P-CSCF server 2 transmits the request REG1 to the I-CSCF server 3 as identified in this way.

On receiving the request REG1 (step F10), the I-CSCF server 3 puts the registration request REG1 on hold and analyzes the content of this request REG1 (test step F20).

More particularly, during this analysis step, it detects that the request REG1 contains a public identity only (i.e. the public identity IMPU), but does not contain a private identity (answer no to test step F20).

The I-CSCF server 3 then derives (i.e. generates) a private identity IMPId from the public identity IMPU (step F30). For this purpose, it proceeds as described in paragraph §5.3.1.2 of Document TS 24.229.

It should be observed that the steps F10 and F20 are identical to the step E30 of the prior art, as described above with reference to FIG. 1.

The I-CSCF server 3 then sets a Boolean flag FLAG to the value TRUE (also written 1): this flag indicates that the private identity IMPId was generated by the I-CSCF server 3 (step F40).

Naturally, there is no limitation associated with the type of information used for indicating whether the private identity IMPId was or was not derived from the public identity IMPU by the I-CSCF server 3. The invention is not limited to using a Boolean flag. Thus, in another implementation of the invention, it is possible to envisage that the I-CSCF server 3 adds a determined suffix or prefix to the private identity IMPId to indicate whether or not the private identity IMPId was derived from the public identity by the I-CSCF server 3.

The I-CSCF server 3 then interrogates the user data HSS 5 (step F50), sending it a Diameter UAR checking request, referenced M1, containing the pair formed by the public identity IMPU received in the request REG1 and the private identity IMPId derived from the public identity IMPU by the I-CSCF server 3. This checking request M1 is a request to check that the user associated with the identities (IMPU, IMPId) is entitled to register with the core network 1.

In accordance with the invention, the I-CSCF server 3 also inserts the flag FLAG set of the value TRUE in the checking request M1, prior to sending it to the HSS 5.

In the presently-described implementation, the flag FLAG is inserted by the I-CSCF server 3 in a field of the UAR checking request M1.

With reference to FIG. 5, on receiving the checking request M1 (step G10), the HSS 5 analyzes the identities and the other information present in the request M1: this analysis seeks in particular to determine whether the private identity present in the request (referenced IMPIrx in FIG. 5, where IMPIrx is equal to IMPId in the presently-described example) was or was not generated by the I-CSCF server 3 that originated the checking request (test step G20).

For this purpose, the HSS analyzes the value of the flag FLAG inserted by the I-CSCF server 3 in the request M1 (test step G20).

In the presently-described example, the flag FLAG is set to the value TRUE (answer "yes" to test step G20), in other words, the HSS 5 uses this flag to determine that the private identity received in the checking request M1 was generated by the I-CSCF server 3.

In accordance with the invention, the HSS 5 then performs a check based solely on the public identity IMPU contained in the request M1, this check seeking to determine whether the terminal 6 using the public identity IMPU is entitled to register with the core network 1 (and in particular with the S-CSCF server 4) (step G30).

In other words, during this checking step, the HSS 5 does no more than verify that a legitimate user is indeed contained in its non-volatile memory 15 in association with the public identity IMPU.

Where appropriate (answer "yes" to test step G40), the terminal 6 is authorized to register with the core network 1 using the public identity IMPU (step G50).

In the presently-envisaged example, the public identity IMPU is indeed contained in the memory 15 of the HSS 5, in other words the HSS 5 acts during the step G50 to determine that the terminal 6 is entitled to register with the core network.

In contrast, if the public identity IMPU is not contained in the memory 15 of the HSS 5 (answer no to test step G40), that means that the public identity used by the terminal 6 is not known to the core network 1 and that the terminal is therefore not authorized to register with the core network 1 using the public identity IMPU (step G60).

The HSS 5 sends the result of the check performed on the basis of the public identity IMPU to the I-CSCF server 3 in a Diameter UAA message R1 (step G70).

When the result of the check is positive, the HSS 5 also indicates in the answer R1 the capabilities needed by the S-CSCF server that is to be selected for registering the terminal 6 and also capabilities that are optional. The step G70 is identical to the prior art step E60 described with reference to FIG. 1.

Thus, in the presently-described example, the HSS 5 sends a Diameter UAA message R1 (Success) to the I-CSCF server 3, informing in that the user associated with the public identity IMPU is indeed known to the core network 1 and is entitled to register with the terminal 6.

With reference to FIG. 4, the I-CSCF server 3 receives the answer message R1 (step F60) and analyzes the answer from the HSS 5 contained in the message R1.

In the presently-envisaged example, since the terminal 6 is entitled to register with the core network 1 using the public identity IMPU (answer "yes" to test step F70) the I-CSCF server 3 selects an S-CSCF registration server to which the request sent by the terminal 6 should be sent for registration purposes. For this purpose, it proceeds in a manner known to the person skilled in the art on the basis of the capabilities indicated by the HSS 5 in the message R1.

In contrast, if the terminal 6 is not entitled to register with the core network 1 using the public identity IMPU (answer no to test step F70), the I-CSCF server 3 rejects the request REG1 sent by the terminal 6 (step F110).

It is assumed in this example that the I-CSCF server 3 selects the S-CSCF server registration server 4 in order to proceed with registration of the terminal 6.

The I-CSCF server 3 then transfers to the S-CSCF server 4 the registration request REG1 received from the terminal 6 (step F80).

The S-CSCF server 4 creates a context that is associated with the user of the terminal 6 and proceeds with authentication.

More particularly, it requests data enabling the user associated with the public identity IMPU to be authenticated with the HSS 5 by means of a Diameter MAR.

This MAR contains the public identity IMPU contained in the registration request REG1.

Since the registration request REG1 does not contain a private identity for the user, the S-CSCF server 4 in turn uses the public identity IMPU to derive the private identity IMPId in similar manner to the I-CSCF server 3, and it inserts this private identity into the MAR.

In the presently-described implementation, the S-CSCF server 4 also sets a Boolean flag FLAG' to the value TRUE (also written 1) indicating that the private identity IMPId contained in the MAR was generated by itself, and it inserts this flag into the MAR before sending it to the HSS 5 in order to interrogate it.

In another implementation, the S-CSCF server 4 may proceed in a manner similar to that shown in FIG. 1 in order to obtain data enabling the user to be authenticated and it need not insert the flag FLAG' in the MAR prior to sending it to the HSS 5.

In response to this request, the S-CSCF server 4 receives via a Diameter MAA message the private identity IMPI and the password PWD of the user U as registered when taking out a subscription with the HSS and as stored in the non-volatile memory 15. This information is naturally encrypted to ensure confidentiality. It is stored in the context of the user of the terminal 6 as previously created by the S-CSCF server 4.

Thereafter, the S-CSCF server 4 returns a negative registration SIP answer (401 Unauthorized) to the terminal 6 containing a challenge that ought to enable the terminal 6 to calculate a user authentication result by using its own password.

The terminal 6 calculates the user authentication result RES and sends a second register registration request REG2 to the P-CSCF server 2, this request containing its public identity IMPU, a private identity IMPI', and the user authentication result RES.

The P-CSCF server relays the second request REG2 to the I-CSCF server 3.

On receiving the request REG2 (step F10), the I-CSCF server 3 analyses the identities contained in the request REG2 (test step F20) and thus detects during this analysis that the request REG2 contains a public identity IMPU and a private identity IMPI' (answer "yes" to test step F20).

It then sets the Boolean flag FLAG to the value FALSE (also written 0): this flag set to this value indicates that the private identity IMPI' was not generated by the I-CSCF server 3, but was received in the registration request coming from the terminal 6 (step F90)

Thereafter, I-CSCF server 3 interrogates the user data HSS 5 (step F100) using a Diameter UAR checking request, referenced M2 and containing:

firstly the pair formed by the public identity IMPU and the private identity IMPI' as received in the request REG2 by the I-CSCF server 3; and secondly the flag FLAG set to the value FALSE; with this being for the purpose of determining whether the user associated with the identities (IMPU, IMPI') is authorized to register with the core network 1 using the terminal 6. The request M2 is thus a request for checking that the user is entitled to register in the meaning of the invention.

In the presently-described implementation, and as described above, the flag FLAG is inserted by the I-CSCF server 3 into a field of the UAR checking request M2.

In another implementation, the flag FLAG is set to FALSE by the I-CSCF server 3 and is inserted in the checking request M2 only when the private identity IMPI' is an identity derived from the public identity as received in the registration request, and thus derived by an entity that is distinct from the I-CSCF server 3 that does not form part of the core network 1.

With reference to FIG. 5, on receiving the checking request M2 (step G10), the HSS 5 analyses the identities and other information present in the request M2 in order to determine whether the private identity present in the request M2 (IMPIrx is equal to IMPI' in FIG. 5) was or was not generated by the I-CSCF server 3.

For this purpose, it analyses the value of the flag FLAG inserted by the I-CSCF server 3 into the checking request M2 (test step G20).

In the presently-described implementation, the flag FLAG is set to the value FALSE, in other words the HSS 5 uses this flag to determine that the private identity IMPI' was not generated by the I-CSCF server 3, but was received by it in the registration request coming from the terminal 6 (answer "no" to test step G20).

In accordance with the invention, the HSS 5 then performs a check based on the pair formed by the public identity IMPU and on the private identity IMPI' contained in the request M2, seeking to determine whether the terminal 6 using these identities is entitled to register with the core network 1 (and in particular with the S-CSCF server 4) (step G80).

In other words, the HSS 5 verifies during this check that a legitimate user is indeed contained in its non-volatile memory 15 in association with the pair formed by the public identity IMPU and by the private identity IMPI', and is thus authorized to register with the S-CSCF server 4.

Where appropriate (answer "yes" to test step G90), in other words if the private identities IMPI and IMPI' match (i.e. are identical), the HSS 5 deduces that the terminal 6 (or in equivalent manner, the user of the terminal 6) is authorized to register with the core network 1 using the identities IMPU and IMPI' (step G50).

In contrast, if the pair (IMPU, IMPI') is not contained as such in the memory 15 of the HSS 5 (e.g. the public identity IMPU does indeed exist in the memory 15 but is not associated with the private identity IMPI', i.e. IMPI'≠IMPI), then that means that the terminal 6 (or in equivalent manner the user of the terminal 6) is not authorized to register with the core network 1 (step G60).

The HSS 5 sends the result of the check performed on the basis of the public identity IMPU and of the private identity IMPI' to the I-CSCF server 3 in a Diameter UAA message R2 (step G70).

In order to show more clearly the advantages provided by the invention, it is assumed that the terminal 6 is held by a computer pirate seeking to usurp the identity of the legitimate user U, and that the private identity IMPI' included in the request REG2 by the terminal 6 is different from the private identity IMPI associated with the public identity IMPU in the HSS 5.

The check performed by the HSS 5 during the step G80 then applies to the pair (IMPU, IMPI') and leads to a result that is negative, i.e. the pair (IMPU, IMPI') does not correspond to a legitimate user authorized to register with the core network 1.

The HSS 5 thus sends a (Diameter Error Unknown User) Diameter UAA message R2 to the I-CSCF server 3 informing it that the user associated with the pair (IMPU, IMPI') is not known and is therefore not entitled to register with the core network 1, and in particular with the S-CSCF server 4 using the terminal 6.

With reference to FIG. 4, the I-CSCF server 3 receives the answer message R2 (step F60).

Since the terminal 6 is not entitled to register with the core network 1 according to the answer message R2, the I-CSCF server 3 rejects the second registration request REG2 from the terminal 6, e.g. by sending it a 403 Forbidden SIP message (step F110). This message preferably does not contain any information enabling the user of the terminal 6 to determine why registration has been rejected.

In the presently-described implementation, the I-CSCF server 3 also sends a message to the S-CSCF server 4 requesting it to release the resources and the context that have been allocated to the terminal 6 (step F120).

In another implementation, the I-CSCF server 3 does not send a resource release message to the S-CSCF server 4, but the resources allocated to the terminal 6 are released at the expiry of a timeout started on the 401 Unauthorized message being sent by the S-CSCF server to the terminal 6.

Thus, the invention enables the second registration request REG2 sent by the computer pirate to be blocked and rejected as from the I-CSCF server 3, which server 3 is situated upstream from the S-CSCF registration server 4: the second request is therefore not propagated to the S-CSCF server 4. As a result, not only are resources in the core network 1 conserved, but the computer pirate using the terminal 6 is also prevented from gaining precious information that could enable the public identity IMPU of the legitimate user U to be usurped.

Naturally, if the HSS 5 acting during step G90 determines that the private identity IMPI' matches the private identity IMPI registered by the user U, then it sends a positive answer message to the I-CSCF server 3, which message then propagates the registration request REG2 to the S-CSCF server 4 in order to verify the result of the user authentication result RES and finalize registration of the terminal 6.

On receiving the registration request REG2, the S-CSCF server 4 inserts the public identity IMPU and the private identity IMPI' of the user as received in the request REG2 in a Diameter MAR for the HSS 5.

Furthermore, in the presently-described implementation, since the registration request REG2 contains the private identity of the user (namely the private identity IMPI'), the S-CSCF server 4 sets the Boolean flag FLAG' to the value FALSE indicating that the private identity IMPI' contained in the MAR was not generated by the S-CSCF server 4 but was received in the registration request REG2. It inserts this flag in the MAR prior to sending it to the HSS 5.

In another implementation, the S-CSCF server 4 sends in the MAR only the public identity IMPU and the private identity IMPI' of the user as received in the registration request REG2.

Finalization of registration of the terminal 6 by the S-CSCF server 4 on the basis of the answer to the MAR received from the HSS 5 then takes place as in the prior art.

The invention claimed is:

1. A verification method for implementation in a multimedia IP core network, said method comprising:

receiving by an interrogation server of the core network, a registration request to register with a registration server of the core network, said registration request containing a public identity of a user, the interrogation server being situated upstream from the registration server in the core network; and interrogating by the interrogation server, a user data server of the core network, this process comprising sending to the user data server a checking request for checking whether the user is entitled to register with the registration server of the core network, this checking request containing the public identity of the user contained in the registration request and a private identity of the user wherein, when said registration request does not contain a private identity of the user, the private identity of the user is generated by said interrogation server and a verification process is performed;

said verification process further comprising an insertion process of the interrogation server inserting additional information into the checking request prior to sending it to the user data server to check whether the user is entitled to register with the registration server of the core network, which additional information indicates that the private identity of the user contained in the checking request was generated by the interrogation server.

2. The method according to claim 1, wherein the registration request further includes the private identity of the user and a result of authenticating the user.

3. The method according to claim 2, wherein, when the interrogation server determines on the basis of an answer to the checking request received from the user data server that the user is not authorized to register, there is a sending process of sending a message to said registration request to release resources allocated to the user.

4. The method according to claim 1, wherein said additional information is inserted in a field of the checking request.

5. The method according to claim 1, performed in the context of a user authentication procedure in compliance with an SIP Digest procedure or an HTTP Digest procedure.

6. The method according to claim 1, further comprising:

receiving by the registration server, the registration request containing the public identity of the user;

interrogating by the registration server, the user data server by sending a data-obtaining request thereto for obtaining data enabling the user to be authenticated, this data-obtaining request containing the public identity of the user contained in the registration request and the private identity of the user; and inserting by the registration server, additional information into the data-obtaining request prior to sending it to the user data server, which information indicates whether the private identity of the user contained in the data-obtaining request was generated by the registration server or was received thereby in the registration request.

7. A checking method for implementation by a user data server of a multimedia IP core network, the method comprising:

receiving a checking request for checking whether a user is entitled to register with a registration server of the core network, this checking request coming from an interrogation server of the core network situated upstream from the registration server and containing: a public identity and a private identity of the user; and additional information indicating whether the private identity of the user contained in the checking request was generated by the interrogation server or was received thereby in a registration request from the user;

wherein when the user data server determines from this additional information that the private identity of the user was not generated by the interrogation server, a checking process is performed during which it verifies that the pair formed by the public identity and the private identity contained in the checking request corresponds to a user authorized to register; and when it determines from the additional information contained in the checking request that the private identity of the user was generated by the interrogation server, a checking process is performed during which it verifies whether the public identity contained in the checking request corresponds to a user authorized to register.

8. A non-transitory computer readable data medium having stored thereon a computer program containing instructions for executing a verification method for implementation in a multimedia IP core network when said program is executed by a computer, wherein said verification method comprises:

receiving by an interrogation server of the core network, a registration request to register with a registration server of the core network, said registration request containing a public identity of a user, the interrogation server being situated upstream from the registration server in the core network; and interrogating by the interrogation server, a user data server of the core network, this process comprising sending to the user data server a checking request for checking whether the user is entitled to register with the registration server of the core network, this checking request containing the public identity of the user contained in the registration request and a private identity of the user wherein, when said registration request does not contain a private identity of the user, the private identity of the user is generated by said interrogation server and a verification process is performed;

said verification process further comprising an insertion process of the interrogation server inserting additional information into the checking request prior to sending it to the user data server to check whether the user is entitled to register with the registration server of the core network, which additional information indicates that the private identity of the user contained in the checking request was generated by the interrogation server.

9. An interrogation server of a multimedia IP core network, wherein the interrogation server comprises a processor configured to:

receive a registration request from a registration server of the core network and containing a public identity of a user; and interrogate a user data server of the core network and send a checking request to the user data server for checking whether a user is entitled to register with the registration server of the core network, this checking request containing the public identity of the user contained in the registration request and a private identity of the user;

said interrogation server being situated upstream from the registration server in the core network, wherein said processor is further configured to, when said registration request does not contain a private identity of the user:

generate a private identity of the user, and insert additional information into the checking request prior to sending it to the user data server, which additional information indicates that the private identity of the user contained in the checking request was generated by the interrogation server.

10. A user data server of a multimedia IP core network, wherein the user data server comprises a processor configured to:

receive a checking request for checking whether a user is entitled to register with a registration server of the core network, the checking request coming from an interrogation server of the core network situated upstream from the registration server and containing:

a public identity and a private identity of the user; and additional information indicating whether the private identity of the user contained in the checking request was generated by the interrogation server or was received thereby in a registration request from the user; and wherein the user data server is configured to:

verify that the pair formed by the public identity and the private identity contained in the checking request corresponds to a user authorized to register, when said user data server determines from the additional information contained in the checking request that the private identity of the user was not generated by the interrogation server; and verify that the public identity contained in the checking request corresponds to a user authorized to register, when said user data server determines from the additional information contained in the checking request that the private identity of the user was generated by the interrogation server.

11. A multimedia IP core network comprising a user data server and an interrogation server, wherein said user data server comprises a processor configured to:

receive a checking request for checking whether a user is entitled to register with a registration server of the core network, the checking request coming from an interrogation server of the core network situated upstream from the registration server and containing:

a public identity and a private identity of the user; and additional information indicating whether the private identity of the user contained in the checking request was generated by the interrogation server or was received thereby in a registration request from the user; and wherein the user data server is configured to:

verify that the pair formed by the public identity and the private identity contained in the checking request corresponds to a user authorized to register, when said user data server determines from the additional information contained in the checking request that the private identity of the user was not generated by the interrogation server; and verify that the public identity contained in the checking request corresponds to a user authorized to register, when said user data server determines from the additional information contained in the checking request that the private identity of the user was generated by the interrogation server;

and wherein said interrogation server comprises a processor configured to:

receive the registration request from the registration server of the core network and containing the public identity of the user; and interrogate the user data server of the core network and send the checking request to the user data server for checking whether the user is entitled to register with the registration server of the core network, this checking request containing the public identity of the user contained in the registration request and said private identity of the user;

said interrogation server being situated upstream from the registration server in the core network, wherein said processor is further configured to, when said registration request does not contain a private identity of the user:

generate a private identity of the user, and insert additional information into the checking request prior to sending it to the user data server, which additional information indicates that the private identity of the user contained in the checking request was generated by the interrogation server.

12. The multimedia IP core network according to claim 11, further comprising the registration server, wherein the registration server comprises a processor configured to:

receive the registration request containing the public identity of the user;

interrogate the user data server and to send a data-obtaining request to the user data server to obtain data enabling the user to be authenticated, this data-obtaining request containing the public identity of the user contained in the registration request and said private identity of the user; and insert additional information into the data-obtaining request prior to sending it to the user data server, which information indicates whether the private identity of the user contained in the data-obtaining request was generated by the registration server or was received thereby in the registration request.

13. The multimedia IP core network according to claim 11, implementing an IP multimedia system (IMS) architecture, and in which:

the interrogation server is an interrogating call session control function (I-CSCF) server;

the user data server is a home subscriber server (HSS); and the registration server is a serving call session control function (S-CSCF) server.

14. A non-transitory computer readable data medium having stored thereon a computer program containing instructions for executing a checking method for implementation by a user data server of a multimedia IP core network when said program is executed by a computer, wherein said checking method comprises:

receiving a checking request for checking whether a user is entitled to register with a registration server of the core network, this checking request coming from an interrogation server of the core network situated upstream from the registration server and containing:

a public identity and a private identity of the user; and additional information indicating whether the private identity of the user contained in the checking request was generated by the interrogation server or was received thereby in a registration request from the user;

wherein when the user data server determines from this additional information that the private identity of the user was not generated by the interrogation server, a checking process is performed during which it verifies that the pair formed by the public identity and the private identity contained in the checking request corresponds to a user authorized to register; and when it determines from the additional information contained in the checking request that the private identity of the user was generated by the interrogation server, a checking process is performed during which it verifies whether the public identity contained in the checking request corresponds to a user authorized to register.

* * * * *